(12) United States Patent
Sasaki (10) Patent No.: US 7,689,112 B2
(45) Date of Patent: Mar. 30, 2010

(54) LENS SYSTEM HAVING A FUNCTION OF DISPLAYING AN OPERATING DIRECTION OF A FOCUS OPERATION MEMBER FOR SETTING A FOCUS IN A LENS

(75) Inventor: Tadashi Sasaki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 613 days.

(21) Appl. No.: 11/589,971

(22) Filed: Oct. 31, 2006

(65) Prior Publication Data

US 2007/0098390 A1    May 3, 2007

(30) Foreign Application Priority Data

Nov. 1, 2005    (JP) .............................. 2005-318413

(51) Int. Cl.
  G03B 13/30    (2006.01)
  G03B 17/18    (2006.01)
(52) U.S. Cl. ...................................... 396/147; 348/346
(58) Field of Classification Search ................. 396/147, 396/72, 87, 89; 348/346
See application file for complete search history.

(56) References Cited

U.S. PATENT DOCUMENTS

| | | | | |
|---|---|---|---|---|
| 5,278,601 A | * | 1/1994 | Kawanami | 396/87 |
| 5,315,340 A | | 5/1994 | Hirasawa | |
| 5,787,314 A | * | 7/1998 | Iwane | 396/95 |
| 2003/0174414 A1 | | 9/2003 | Sasaki | |
| 2004/0165879 A1 | * | 8/2004 | Sasaki et al. | 396/137 |
| 2005/0151875 A1 | | 7/2005 | Idemura | |
| 2005/0271373 A1 | * | 12/2005 | Tomita | 396/103 |

FOREIGN PATENT DOCUMENTS

| | | |
|---|---|---|
| EP | 1 345 060 A1 | 9/2003 |
| EP | 1 553 434 A1 | 7/2005 |
| JP | 2002-365710 A | 12/2002 |
| WO | WO-02/099495 A1 | 12/2002 |

OTHER PUBLICATIONS

Anonymous; Digital Camera, E-1 Basic Manual, 2003, Olympus Corp.; Retrieved from Internet: URL: http://www.olympus.co.jp/en/support/imsg/digicamera/download/manual/esystem/man_e1_en.pdf, p. 5-p. 6, p. 20-p. 22.
Anonymous: Advanced Manual E300, 2004, Olympus Corp. Retrieved from the Internet: URL:http://www.olympus.co.jp/en/support/imsg/digicamera/download/manual/esystem/man_e300_en.pdf., pp. 25,126.

* cited by examiner

*Primary Examiner*—Christopher Maoney
(74) *Attorney, Agent, or Firm*—Birch, Stewart, Kolasch & Birch, LLP (57) ABSTRACT

A lens system according to an aspect of the present invention includes a focus operation member for manual operation of a focus of a taking lens, a focusing direction detecting device which detects a moving direction of the focus for setting a focused state with respect to a present position of the focus, as a focusing direction, an operating direction display device which displays an operating direction of the focus operation member for moving the focus to the focusing direction on the basis of the focusing direction detected by the focusing direction detecting device, and a reversing device which reverses the operating direction displayed by the operating direction display device.

12 Claims, 7 Drawing Sheets

LENS SYSTEM HAVING A FUNCTION OF DISPLAYING AN OPERATING DIRECTION OF A FOCUS OPERATION MEMBER FOR SETTING A FOCUS IN A LENS

BACKGROUND OF THE INVENTION

1. Field of the Invention

The present invention relates to a lens system, and more particularly, to a lens system having a function of displaying the operating direction of a focus operation member for setting the focus in a taking lens such as a television lens to a focused state.

2. Description of the Related Art

In Japanese Patent Application Laid-Open No. 2002-365710, there is proposed a lens system having a function in which a focus state is displayed even in manual focus (MF) by utilizing a focus state detecting function in autofocus. The lens system makes it possible for a cameraman to perform focusing with reference to the display of focus state at the time of performing MF operation by use of a focus operation member. That is, the lens system makes it possible to move the focus in the focusing direction by operating the focus operation member to an infinite direction when the display of focus state is a front focus state, or by operating the focus operation member to a close-range direction when the display of focus state is a rear focus state.

SUMMARY OF THE INVENTION

However, in the case where the function of displaying a focus state as disclosed in Japanese Patent Application Laid-Open No. 2002-365710 is mounted, the display mode is decided by a manufacturer. Thus, there is a possibility that when the display is used for operating the focus operation member in MF, the operating direction of the focus operation member is easy to be mistaken for some users.

For example, when the focus state is not the focused state, the display of focus state indicates whether the present focus state is shifted from the focused state in the close-range direction or in the infinite direction. Thus, the focus moving direction for setting the focused state can be recognized by referring to the display, and the focus operation member can be operated so as to allow the focus to be moved in the direction.

However, in the case of actual photographing, it is required for an operator to instantaneously judge the operating direction of the focus operation member for setting the focused state. Thus, it is considered that the operator does not clearly recognize the present focus state as described above, but that the operator instantaneously operates the focus operation member to a suitable direction by making a visually indicated spatial direction (such as a vertical direction or a horizontal direction in a display section of a focus state display) displayed by the focus state display as the direction in which the present focus state is shifted from the focused state, directly associated with the spatial operating direction of the focus operation member for setting the focused state with respect to the visually indicated spatial direction. In this case, what kind of relationship between the spatial direction indicated by the focus state display and the suitable operating direction of the focus operation member with respect to the spatial direction is capable of facilitating the operation by the operator, depends on the operator. Therefore, a display mode provided by a manufacturer is not suitable for all the users.

In the case where the focus operation member is a focus knob which is a rotation operating member, the rotation axis of the focus knob is provided laterally with respect to the operator. Thus, the relationship between the operating direction (spatial operating direction) of the focus operation member and the moving direction of focus with respect to the operating direction is different depending on whether the focus knob is provided for right hand operation or for left hand operation. Further, there is a lens system having a function for enabling the relationship between the operating direction of the focus operation member and the moving direction of focus to be reversed by a switch according to the preference of the operator. Thus, the relationship between the operating direction of the focus operation member and the moving direction of focus with respect to the operating direction is also made different according to the selection performed by using the switch. For this reason, the relationship between the direction indicated by the focus state display and the operating direction of the focus operation member for setting the focused state is also made different by the use mode of the focus operation member. Thus, whether or not the relationship is preferred depends on users.

Further, in addition to the mode for displaying the direction in which the present focus state is shifted from the focused state, as information for assisting the operation by MF, as described above, a mode for directly displaying the moving direction of the focus for setting the focused state, and a mode for directly displaying the operating direction (spatial direction) of the focus operation member for setting the focused state are also conceivable. Any of the modes makes it possible to directly or indirectly recognize the operating direction of the focus operation member for setting the focused state. However, what mode of display is preferred depends on users.

For this reason, in the case where the operating direction of the focus operation member for setting the focus in the focused state is displayed, an optimum mode needs to be determined by the user.

The present invention has been made in view of the above described circumstances. An object of the present invention is to provide a lens system which is capable of preferably displaying the operating direction of the focus operation member for setting the focus in the focused state.

In order to achieve the above described object, a lens system according to a first aspect of the present invention comprises a focus operation member for manually operating a focus of a taking lens, with a focusing direction detecting device which detects a moving direction of the focus for setting a focused state with respect to the present position of the focus, as a focusing direction, an operating direction display device which displays an operating direction of the focus operation member for moving the focus in the focusing direction on the basis of the focusing direction detected by the focusing direction detecting device, and an reversing device which reverses the operating direction displayed by the operating direction display device.

According to the first aspect, the relationship between the operating direction of the focus operation member displayed by the operating direction display device and the actual operating direction of the focus operation member with respect to the displayed operating direction can be set so as to be suitable for a user.

The lens system according to a second aspect of the present invention further comprises a selecting device which selects whether or not the operating direction displayed by the operating direction display device is to be reversed by the reversing device. According to the second aspect, it is possible for the user to arbitrarily select whether or not the operating direction of the focus operation member, which is displayed by the operating direction display device, is reversed.

The lens system according to a third aspect of the present invention is characterized in that in one of the first and second aspects, the operating direction display device displays an operating direction by turning on one of display sections which are provided for the upper and lower sides of a predetermined central position or for the left and right sides of a predetermined central position, respectively. The present invention represents one of the modes for displaying the operating direction, and lamps, graphics on a view finder or the like are conceivable as the modes of the display.

The lens system according to a fourth aspect of the present invention, is characterized in that in one of the first, second and third aspects, the focusing direction detecting device detects a focusing direction by detecting a direction in which the contrast of an image formed by the taking lens is enhanced. According to the present invention, for example, when the lens system is provided with an autofocus function, the detection of the focusing direction which is used in the autofocus function can also be used for displaying the operating direction of the focus operation member.

The lens system according to the present invention makes it possible to preferably display the operating direction of the focus operation member for setting the focus to the focused state.

DETAILED DESCRIPTION OF THE PREFERRED EMBODIMENTS

In the following, an exemplary embodiment as the best mode for carrying out the present invention will be described, with reference to the accompanying drawings.

Figure 1:
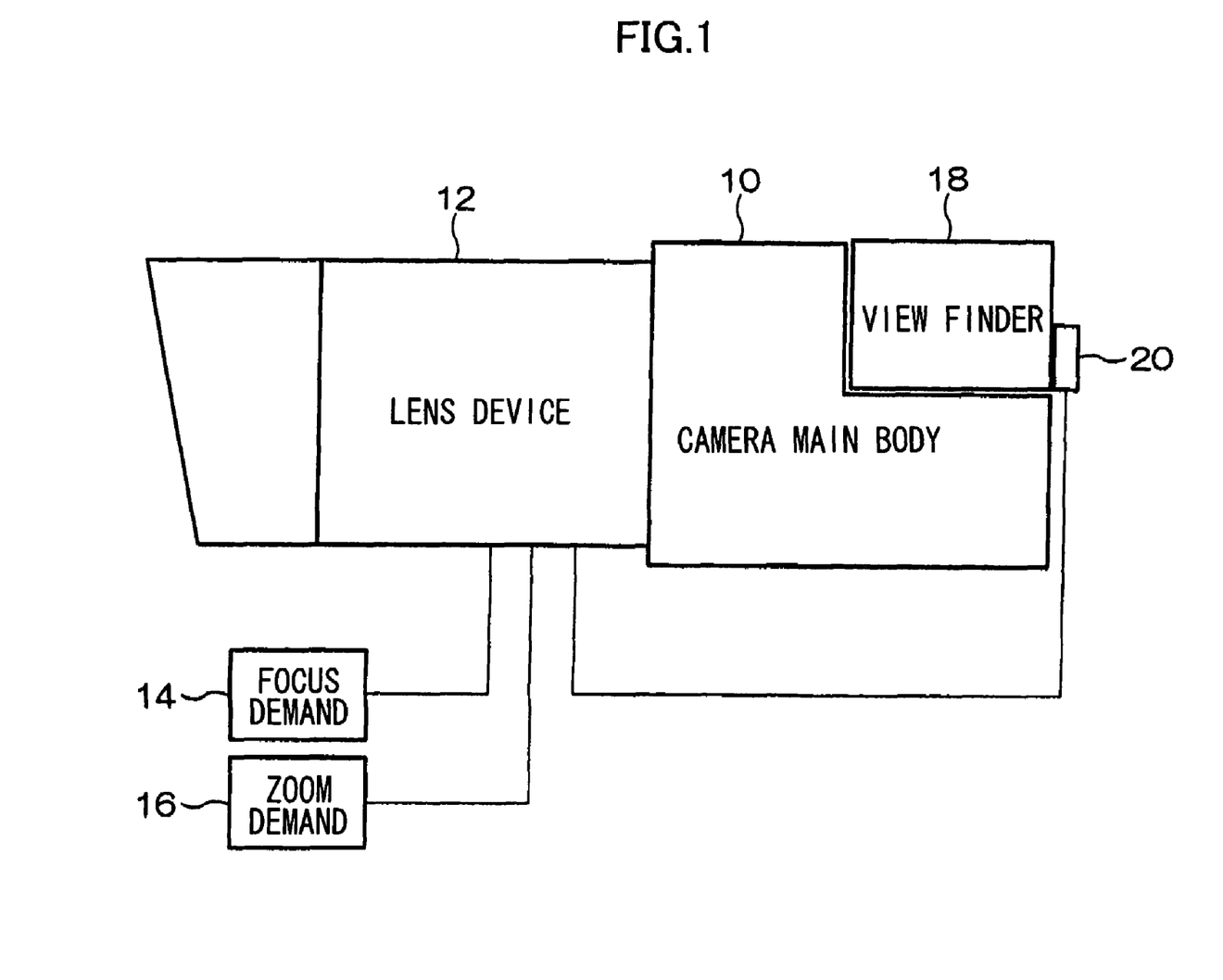
FIG. 1 is a figure showing a constitution of the whole television camera system using a lens system to which the present invention is applied.

FIG. 1 is a figure showing a constitution of the whole television camera system using a lens system to which the present invention is applied. The television camera system shown in the figure is a photographing system for photographing video images for television broadcasting, and comprises a camera main body 10, a lens device 12, a focus demand 14, a zoom demand 16, a view finder 18, an operating direction display 20, and the like.

The camera main body 10 is mounted with an image sensor (for example, CCD) which captures an object image formed by an optical system (taking lens) of the lens device 12, and a signal processing circuit which generates a video signal of predetermined form from a signal obtained by the image sensor, or the like.

The lens device 12 comprises an optical system (taking lens) which forms an object image, and a control system which controls focus, zoom and the like of the optical system. The object image formed by the optical system is captured by the camera main body 10, so as to be obtained as a video signal. Note that the optical system and the control system of the lens device 12 will be described in detail below.

The focus demand 14 is a controller for enabling an operator (cameraman) to mainly operate the focus of the optical system of the lens device 12 by manual focus (MF), and is connected to a predetermined connector of the lens device 12 by a cable or the like. The focus demand 14 is provided with a focus operation member (focus knob) or the like which is used for MF operation, and is arranged such that a focus command signal commanding a movement to a focus position corresponding to a rotational position of the focus knob is transmitted from the focus demand 14 to the lens device 12. The control system of the lens device 12 performs control of the focus (focus lens) of the optical system in accordance with the focus command signal at the time of MF control.

The zoom demand 16 is a controller for enabling the cameraman to mainly perform manual operation of the optical system zoom of the lens device 12, and is connected to a predetermined connector of the lens device 12 by a cable and the like. The zoom demand 16 is provided with a zoom operating member, and is arranged such that a zoom command signal commanding a movement at a zoom speed corresponding to an operating position of the zoom operating member is transmitted from the zoom demand 16 to the lens device 12. The control system of the lens device 12 performs control of the zoom (zoom lens) of the optical system in accordance with the zoom command signal.

The view finder 18 receives a video signal generated by the camera main body 10, and displays a video image photographed at present on the basis of the video signal. It is possible for the cameraman to confirm a video image photographed at present by the displayed image, and to operate the focus demand 14, the zoom demand 16 or the like for obtaining an image with desired composition.

The operating direction display 20 is installed, for example, in a hood (described below) of the view finder 18, and as will be described in detail below, is arranged so as to display an operating direction in which the focus knob of the focus demand 14 is to be operated by the cameraman in order to set the focus of optical system of the lens device 12 to a focused state (focusing position) at the time of MF. By referring to the display, it is possible for the cameraman to instantaneously judge the operating direction of the focus knob for setting the focused state, and to suitably move the focus in the focusing direction by operating the focus knob to the operating direction.

Figure 2:
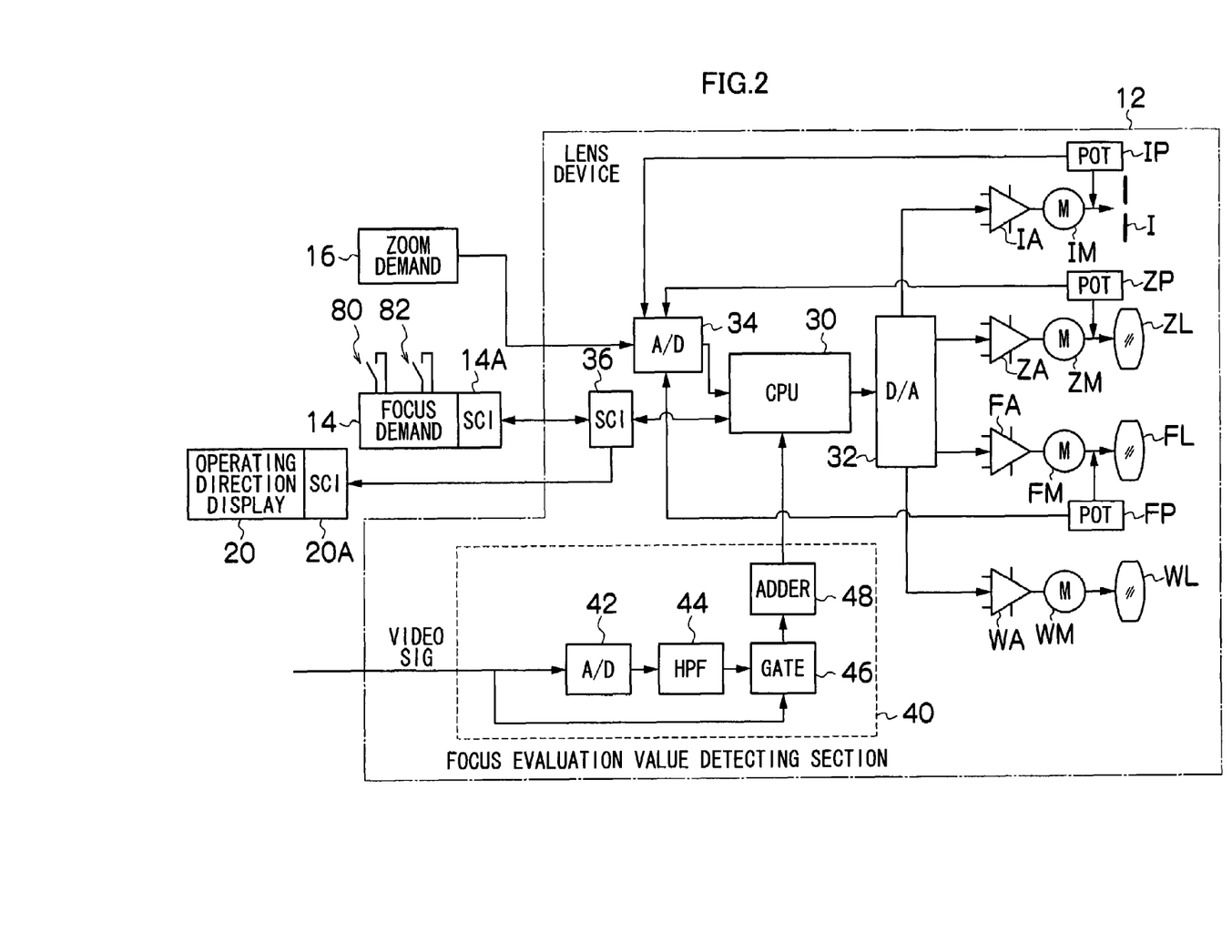
FIG. 2 is a block diagram showing a constitution of the lens system according to the present invention.
Figure 3:
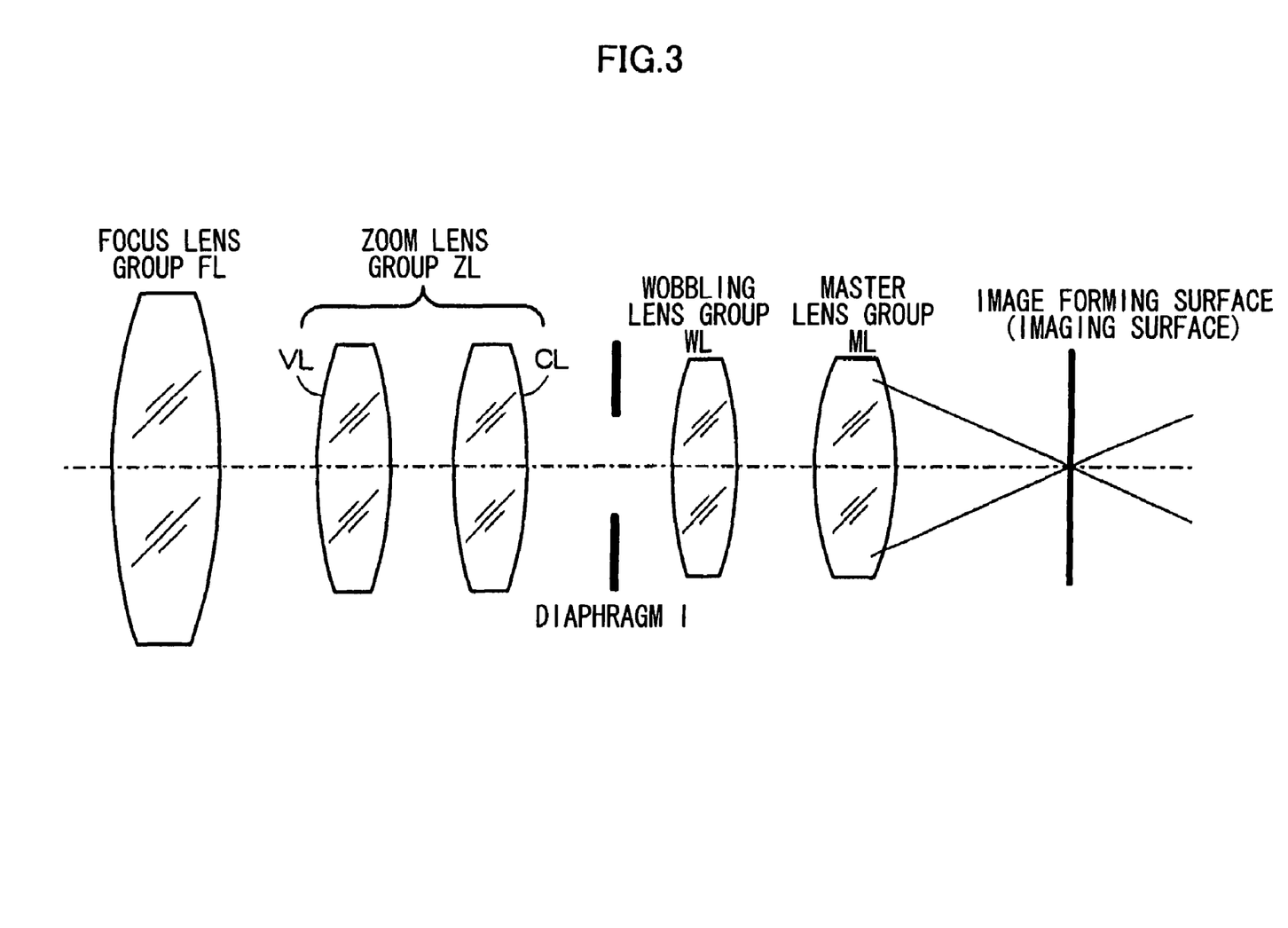
FIG. 3 is a figure showing a constitution of an optical system of a lens device.

FIG. 2 and FIG. 3 are a block diagram showing a constitution of the lens system in the above described television camera system, and a figure showing a constitution of the optical system (taking lens) of the above described lens device 12. As shown in FIG. 2, the lens system comprises a lens device 12, a focus demand 14, a zoom demand 16, and an operating direction display 20. As shown, for example, in FIG. 3, the taking lens comprises a focus lens (group) FL, zoom lens (group) ZL, diaphragm I, wobbling lens (group) WL, and master lens (group) ML, and they are arranged in a lens barrel (not shown) along an optical axis in order from the object side. The focus lens FL, the zoom lens ZL, and the wobbling lens WL are supported so as to be movable back and forth along the optical axis. Thus, the focus position (focusing position) of the taking lens is changed by moving the focus lens FL or the wobbling lens WL, and the image magnification of the taking lens is changed by moving the zoom lens ZL. Note that the zoom lens ZL comprises a variator lens (group) VL for changing the image magnification, and a compensator lens group (CL) which corrects focal deviations caused by the movement of the variator lens (group) VL, and these lenses VL and CL are arranged to be associatively moved in a predetermined positional relationship with each other.

In FIG. 2 showing a constitution of the lens system, there is shown a constitution of the control system for performing control of the focus lens FL, the zoom lens ZL, the wobbling lens WL, and the diaphragm I of the taking lens. As shown in the figure, motors FM, ZM, WM and IM are connected to the focus lens FL, the zoom lens ZL, the wobbling lens WL and the diaphragm I, respectively. Thus, the focus lens FL, the zoom lens ZL, the wobbling lens WL and the diaphragm I are arranged to be electrically driven by the motors FM, ZM, WM and IM, respectively. Thereby, the focus lens FL, the zoom lens ZL and the wobbling lens WL are driven so as to be moved back and forth in the optical axis direction, and the diaphragm I is driven so as to perform open/close operation.

On the other hand, the lens device 12 is mounted with a CPU 30 which totally controls the whole lens system. The CPU 30 is connected with amplifiers FA, ZA, WA and IA which supply drive voltages to the motors FM, ZM, WM and IM via a D/A converter 32, respectively. When a drive signal of a predetermined voltage range is supplied from the CPU 30 to each of the amplifiers FA, ZA, WA and IA via the D/A converter 32, each of the motors FM, ZM, WM and IM is driven at a velocity (direction and speed) in accordance with the voltage of the drive signal. Thereby, the operating speed of the focus lens FL, the zoom lens ZL, the wobbling lens WL and the diaphragm I is arranged to be controlled by the CPU 30.

Further, respective positions of the focus lens FL, the zoom lens ZL and the diaphragm I are detected by potentiometers FP, ZP and IP, so that position signals representing the respective positions are arranged to be given to the CPU 30 via an A/D converter 34. The CPU 30 is arranged so as to be capable of performing control (feedback control) of the respective positions of the focus lens FL, the zoom lens ZL and the diaphragm I by referring to the position signals. Note that the precise position control of the wobbling lens WL is not needed, and hence, the position of the wobbling lens WL is not arranged to be detected.

As shown in FIG. 1, the focus demand 14 and the zoom demand 16 are connected to the lens device 12. As shown in FIG. 2, the focus demand 14 and the CPU 30 of the lens device 12 are connected so as to be capable of serially communicating with each other via a serial communication interfaces (SCIs) 36 and 14A which are incorporated in the focus demand 14 and the lens device 12, respectively. The zoom demand 16 and the CPU 30 of the lens device 12 are connected with each other via the A/D converter 34.

A focus command signal commanding a movement to a focus position corresponding to an operating position of the focus knob is arranged to be outputted from the focus demand 14, while a zoom command signal commanding a movement at a zoom speed corresponding to an operating position of the zoom operating member is arranged to be outputted from the zoom demand 16. The focus command signal and the zoom command signal are arranged to be read by the CPU 30.

In MF control, the CPU 30 controls the position of the focus lens FL by adjusting the value of the drive signal outputted to the amplifier FA, as described above, so that the position of the focus lens FL is set to the focus position (focus target position) which is commanded by the focus command signal given from the focus demand 14. Thereby, the focus of the taking lens is controlled to be set to the focus position corresponding to the operating position of the focus knob.

Note that the focus control includes MF control and AF (autofocus) control, and the details of AF control will be described below.

Further, in zoom control, the CPU 30 controls the moving speed of the zoom lens ZL by adjusting the value of the drive signal outputted to the amplifier ZA, so that the moving speed of the zoom lens ZL is set to the zoom speed (target speed) commanded by the zoom command signal given from the zoom demand 16. Thereby, the zoom of the taking lens is controlled so as to be operated at the zoom speed corresponding to the operating position of the zoom operating member of the zoom demand 16.

Note that although the diaphragm control is not shown in FIG. 2, for example, an iris command signal commanding an aperture amount (f number) of the diaphragm I is arranged to be given to the CPU 30 from the camera main body 10 in FIG. 1, and the CPU 30 controls the position (aperture amount) of the diaphragm I in accordance with the iris command signal.

Subsequently, AF control is explained in detail. The focus control includes MF control and AF control, and is arranged to make it possible for a cameraman to switch the selection of the MF mode for enabling the CPU 30 to perform the above described MF control processing or the AF mode for enabling the CPU 30 to perform the AF control processing, for example, by using a predetermined mode changeover switch provided for the focus demand 14. The CPU 30 performs the processing according to the mode selected by the mode changeover switch.

When the AF mode is selected, the CPU 30 automatically sets the focus of the taking lens to a focused state by controlling the position of the focus lens FL so that the focus evaluation value which can be obtained from the focus evaluation value detecting section 40 becomes maximum (local maximum).

The focus evaluation value detecting section 40 detects the highness of the contrast of an image (video image) which is formed by the taking lens and captured by the image sensor of the camera main body 10, as a focus evaluation value. As shown in FIG. 2, the focus evaluation value detecting section 40 comprises an A/D converter 42, a high pass filter (HPF) 44, a gate circuit 46, an adder 48 and the like. A video signal (luminance signal) of a video image photographed at present is arranged to be inputted into the lens device 12 from the camera main body 10 (not shown in the figure), and to be inputted into the A/D converter 42 of the focus evaluation value detecting section 40.

When the video signal inputted into the A/D converter 42 is converted into a digital signal by the A/D converter 42, the signal containing only high frequency components of the video signal is then extracted by the HPF 44. Subsequently, the high frequency components of the video signal outputted from the HPF 44 is inputted into the gate circuit 46, and signals only within a predetermined AF area (for example, a rectangular area at the central part of the screen) set in a photographing range (screen) are extracted. Note that the video signal inputted into the A/D converter 42 is also inputted into the gate circuit 46, and video signals in the AF area are extracted from the respective field images of the video signal inputted from the HPF 44 on the basis of synchronizing signals (a vertical synchronizing signal and a horizontal synchronizing signal) included in the video signal.

Subsequently, the video signals in the AF area outputted from the gate circuit 46 are inputted into the adder 48. The inputted video signals are integrated for every one screen (for every one field image) by the adder 48. The integrated value indicates the highness of the contrast of the object image in the AF area, and is arranged to be read by the CPU 30 as the focus evaluation value.

The CPU 30 moves the focus lens FL to a position where the focus evaluation value obtained from the focus evaluation value detecting section 40 becomes maximum (local maximum) by the so-called mountain climbing system, with reference to the focus evaluation value. That is, the CPU 30 moves the wobbling lens WL back and forth by a minute amount at a predetermined timing (wobbling operation), so as to vary the focus position (focusing position). Thereby, the CPU 30 acquires focus evaluation values, for example, when the wobbling lens WL is in a predetermined reference position and when the wobbling lens WL is in displacement positions displaced forward and backward with respect to the reference position, from the focus evaluation value detecting section 40. Then, the CPU 30 detects which of the states of front focus, rear focus and focusing the focus state is, by comparing the magnitude of the focus evaluation values in each of the positions. That is, the CPU 30 detects a focused state in which the focus evaluation value becomes maximum (local maximum), or a focusing direction when the focus state is not the focused state, i.e., a direction in which the focus evaluation value is increased.

If the CPU 30 detects a focusing direction when the focus state is not the focused state, the CPU 30 moves the focus lens FL in the direction in which the focus evaluation value is increased, by moving the focus lens FL in the focusing direction (in the infinite direction when the focus state is a front focus state, and in the close-range direction when the focus state is a rear focus state). Then, when the CPU 30 detects that the focus state is the focused state, the CPU 30 makes the focus lens FL stopped at the position.

On the basis of such processing performed by the CPU 30, the focus of the taking lens is automatically set to the focused state. Note that the processing of AF control is not limited to the above described processing, and any kind of processing may also be applied as the processing of AF control. Further, the processing for detecting the focus evaluation value which indicates the highness of the contrast of a taken image and the processing for detecting the present focus state (processing for detecting the focused state and the focusing direction) may also be performed by a method other than the method in the present embodiment. In particular, it is possible to obtain the video signal used for detecting the focus evaluation value not from the camera main body 10, but obtained from an image sensor for AF which is mounted to the lens device 12. In this case, for example, a light dividing device such as a half mirror is provided for the taking lens, so that the object video image can be captured with the image sensor for AF from the object light which is branched by the light dividing device from the object light entering to the image sensor of the camera main body 10. Further, the object light branched by the light dividing device is captured by the image sensor for AF having plural imaging surfaces which have different optical path lengths, and focus evaluation values are detected from the video signals of video images captured by the respective imaging surfaces, so as to be compared with each other. Thereby, the focus state can be detected without performing the wobbling operation by the wobbling lens WL.

Figure 4:
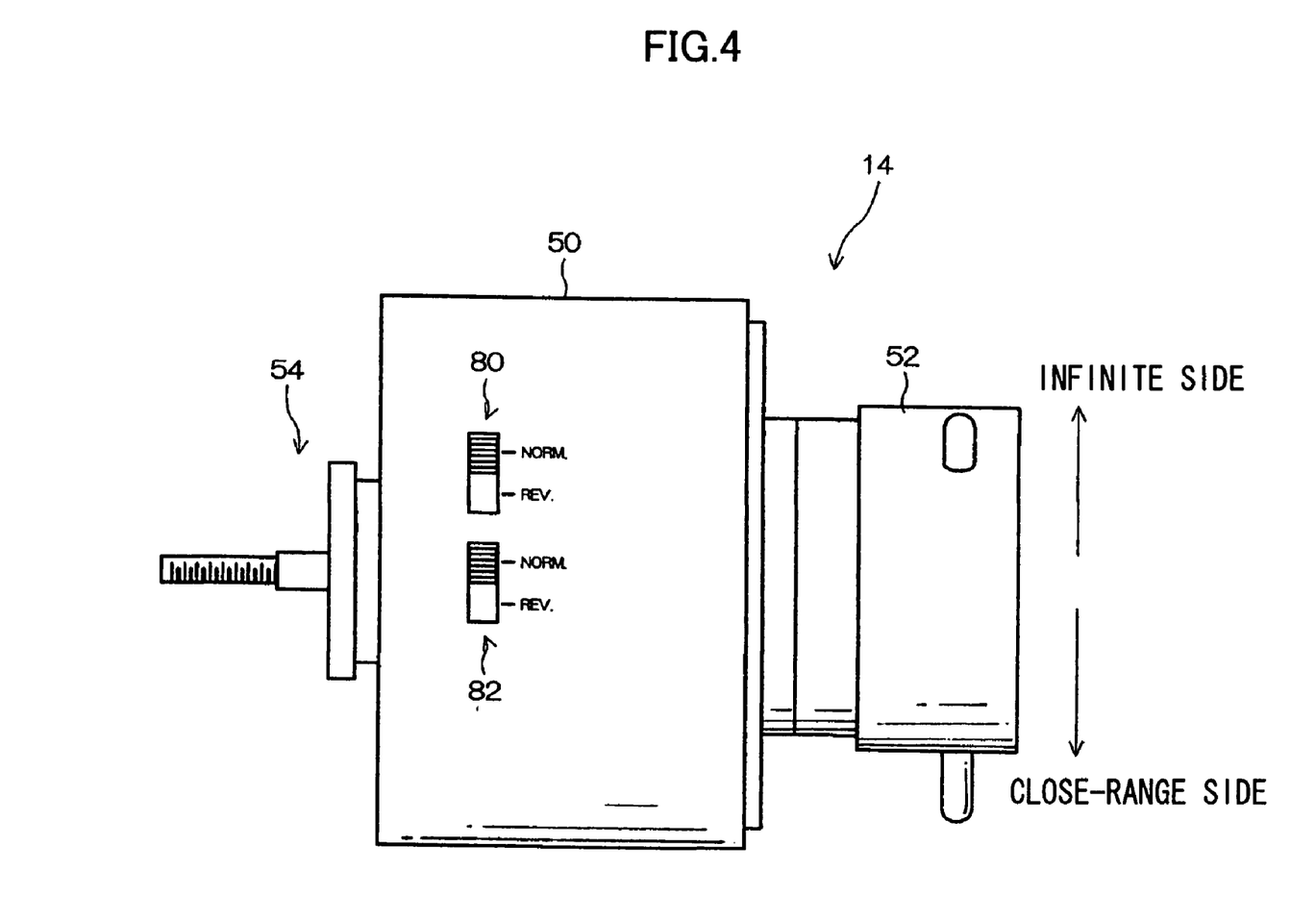
FIG. 4 is a front view showing an appearance of a focus demand.

Next, the display of operating direction by the operating direction display 20 is explained in detail. The operating direction display 20 is arranged to display as to in which operating direction of a close-range direction and an infinite direction the focus knob 52 is to be operated in order to move the focus of taking lens in the focusing direction, in the case where the cameraman desires, in the MF control (MF mode), to set the focus to a focused state by operating the focus knob 52 of the focus demand 14 as shown in FIG. 4. The focus demand 14 shown in FIG. 4 is provided with a demand main body 50 with necessary circuits incorporated therein and a focus knob 52 supported by the demand main body 50 so as to be rotatable with the horizontal direction of the figure as the direction of the rotation axis. Further, a fixing device (a part of the fixing device) 54 is fixed to the demand main body 50, and for example, the focus demand 14 is installed in a predetermined position by the fixing device 54 so that the state shown in the figure may be on the front side as seen from the side of the cameraman at the time when the cameraman actually operates the focus knob 52. Note that the focus demand 14 is installed, for example, in an operation rod and the like for performing panning/tilting operation, which rod is extended from a frame (pedestal dolly and the like) supporting the camera main body 10 and the lens device 12. The case where the focus demand 14 is installed so that the state shown in the figure may be on the front side, is the case where the cameraman is enabled to hold and operate the focus knob 52 with the right hand, and is a standard installation mode of the focus demand 14.

Figure 5:
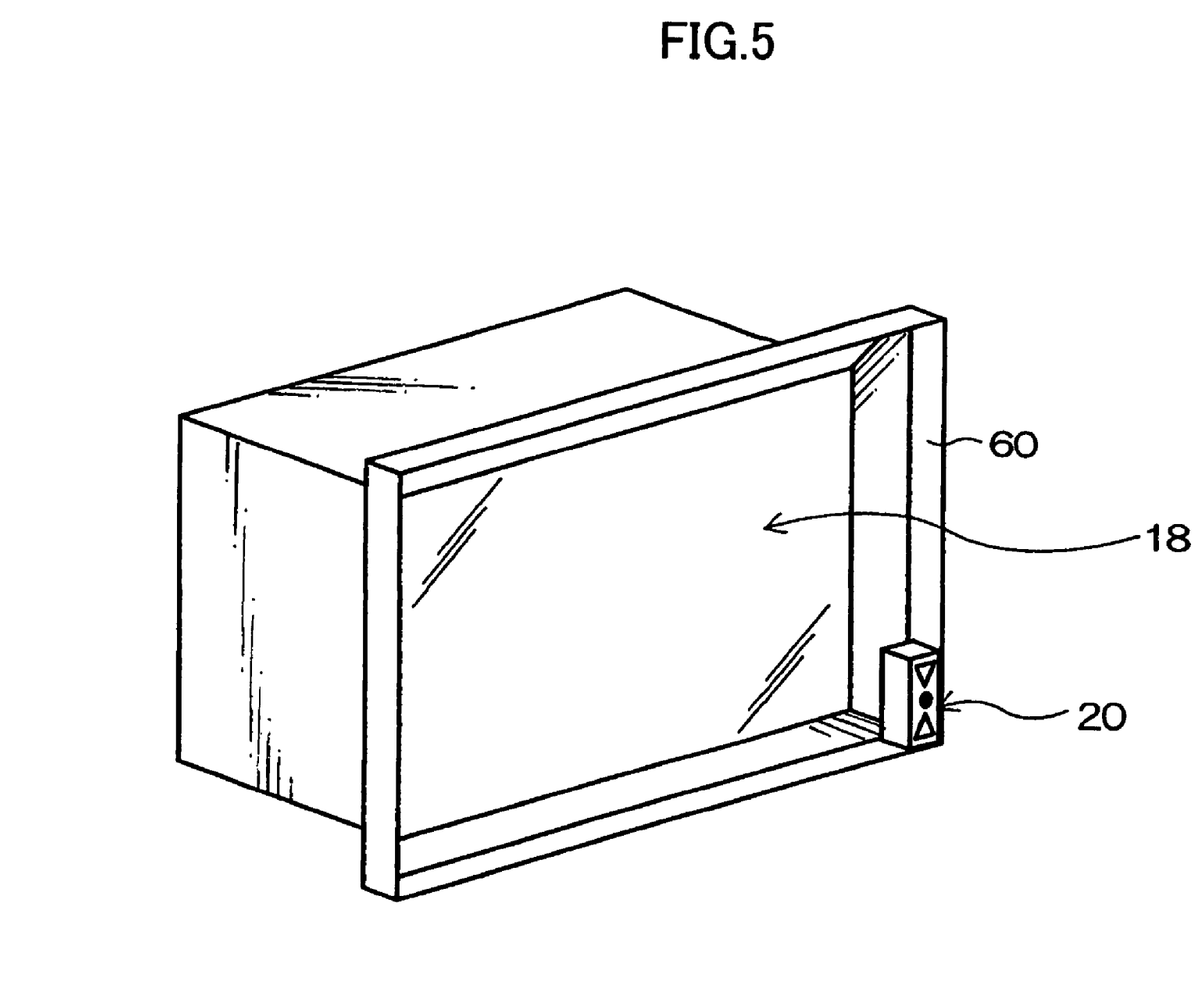
FIG. 5 is a perspective view showing an operating direction display provided for a view finder.

On the other hand, as shown in FIG. 5, the operating direction display 20 is attached to a hood 60 which is installed, for example, at the periphery of display screen of the view finder 18. As shown in FIG. 1 and FIG. 2, the operating direction display 20 is connected to the lens device 12 by a cable and the like, and to the CPU 30 of the lens device 12, so that the serial communication between the operating direction display 20 and the CPU 30 can be performed through the SCI 20A and the SCI 36.

Figure 6:
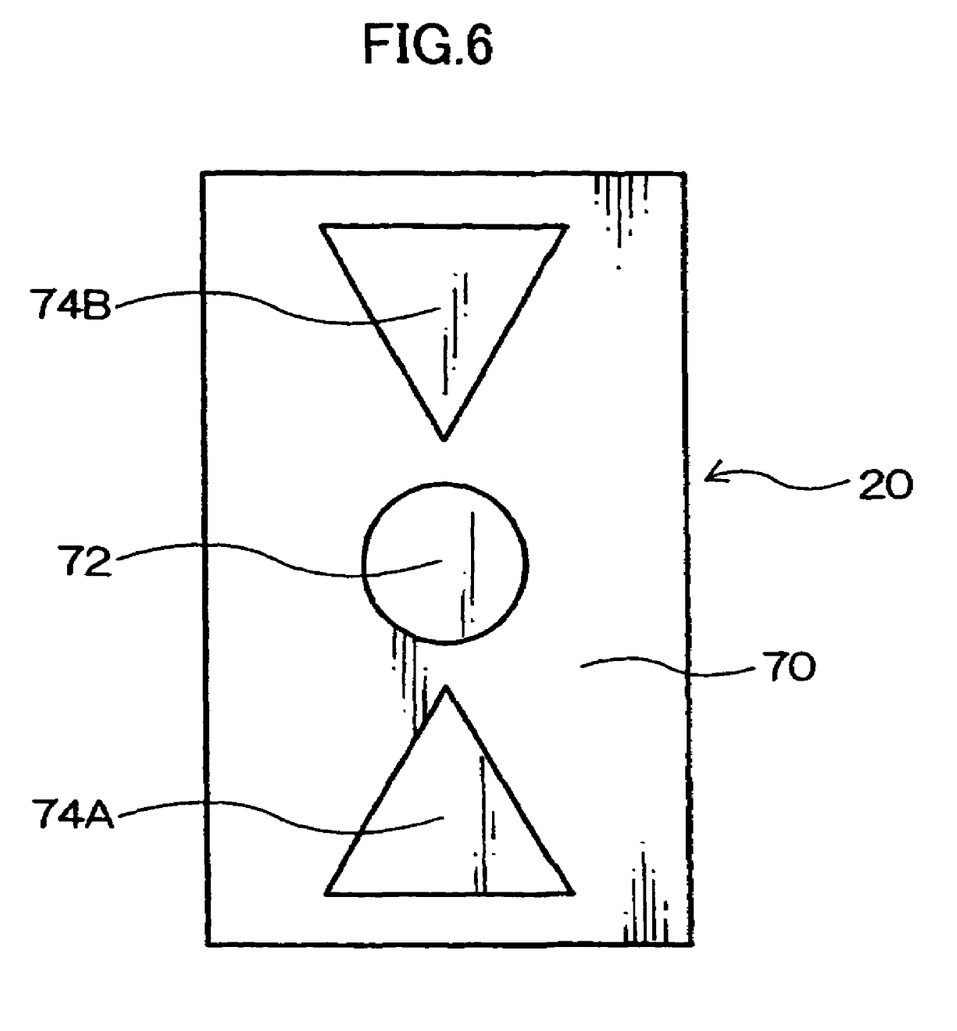
FIG. 6 is a front view showing a constitution of a display section of the operating direction display.

As shown in FIG. 6, the display section 70 of the operating direction display 20 is provided with three light-emitting sections 72, 74A and 74B which emit light by means of lamps, such as LEDs. At the center of the three light-emitting sections, the light-emitting section 72 (hereinafter referred to as central light-emitting section 72) which emit light in a circular shape, is provided, and the light-emitting section 74A and the light-emitting section 74B which emit light in a triangular shape are provided in the upper and lower sides of the central light-emitting section 72. Further, one vertex of each of the triangles of the light-emitting section 74A and the light-emitting section 74B is arranged toward the center. The light-emitting section 74A on the lower side (hereinafter referred to as lower light-emitting section 74A) can be regarded to be equivalent to an upward arrow, and the light-emitting section 74B on the upper side (hereinafter referred to as upper light-emitting section 74A) can be regarded to be equivalent to a downward arrow.

Also when the CPU 30 of the lens device 12 performs the above described MF control processing in MF mode, the CPU 30 enables the wobbling lens WL to suitably perform the wobbling operation similarly to the case of AF control, so as to obtain the focus evaluation value from the focus evaluation value detecting section 40 and to detect a focus state. Then, the CPU 30 transmits, to the operating direction display 20, a display control signal for enabling the operating direction of the focus knob 52 for setting the focused state to be displayed on the basis of the focus state.

When the focus state is the focused state, the display control signal which enables the central light-emitting section 72 in FIG. 6 to be turned on is transmitted from the CPU 30 to the operating direction display 20. Thereby, the central light-emitting section 72 is turned on, and the other light-emitting sections of the lower light-emitting section 74A and the upper light-emitting section 74B are turned off.

When the focus state is a front focus state, i.e., when the focus is shifted to a close-range side, the display control signal which enables the lower light-emitting section 74A to be turned on is transmitted from the CPU 30 to the operating direction display 20, so that the lower light-emitting section 74A is turned on, and the other light-emitting sections of the central light-emitting sections 72 and the upper light-emitting section 74B are turned off. When the front face side (front side) of the focus knob 52 is rotationally operated so as to be moved upward (clockwise) in the focus demand 14 shown in FIG. 4, the focus is arranged to be moved to the infinite direction. Thus, by turning on the triangular lower light-emitting section 74A which is arranged so as to indicate the upward direction, it is possible for the cameraman to recognize that the focus is moved to the focusing direction by operating the focus knob 52 in the upward direction. Note that the fact that the lower light-emitting section 74A provided on the lower side of the central light-emitting section 72 is turned on, can also be understood to indicate that the focus is shifted to the close-range side, and that the operating direction of the focus knob 52 for setting the focused state is the upward direction.

On the other hand, when the focus state is a rear focus state, that is, when the focus is shifted to the infinite side, a display control signal which enables the upper light-emitting section 74B to be turned on is transmitted from the CPU 30 to the operating direction display 20, so that the upper light-emitting section 74B is turned on and other light-emitting sections of the central light-emitting section 72 and the lower light-emitting section 74A are turned off. When the front face side (front side) of the focus knob 52 is rotationally operated so as to be moved downward (counterclockwise) in the focus demand 14 shown in FIG. 4, the focus is arranged to be moved to the close-range direction. Thus, the triangular upper light-emitting section 74B arranged so as to indicate the downward direction is turned on, thereby enabling the cameraman to recognize that the focus is moved to the focusing direction by operating the focus knob 52 in the downward direction. Note that the fact that the upper light-emitting section 74B provided on the upper side of the central light-emitting section 72 is turned on, can also be understood to indicate that the focus is shifted to infinity side, and that the operating direction of the focus knob 52 for setting the focused state is the downward direction.

In this way, it is possible for the cameraman to promptly and certainly move the focus in a focusing direction by operating the focus knob 52 in accordance with the operating direction displayed in the operating direction display 20. Thereby, the operation load for setting the focused state can be reduced.

Meanwhile, as shown in FIG. 4, the demand main body 50 of the focus demand 14 is provided with an operating direction selector switch 80 for reversing the relationship between the rotation direction of the focus knob 52 and the moving direction of the focus with respect to the rotation direction of the focus knob 52, and a direction display selector switch 82 for reversing the display of operating direction in the close-range direction and the display of operating direction in the infinite direction in the operating direction display 20. The operating direction selector switch 80 and the direction display selector switch 82 are arranged to switch between the two states for selecting the normal mode and the reverse mode, respectively. The state of the switches 80 and 82 is arranged to be transmitted to the CPU 30 of the lens device 12 shown in FIG. 2, and to be read by the CPU 30. Note that the above description is based on the premise that the normal mode is selected for both the switches 80 and 82. Further, the operating direction selector switch 80 and the direction display selector switch 82 may also be provided for portions, for example, of the lens device 12, the operating direction display 20 or the like, other than the focus-demand 14.

First, the mode of the operating direction selector switch 80 is explained. In the case where the operating direction selector switch 80 is set to the normal mode, when the focus knob 52 is rotationally operated so that the front side of the focus knob 52 is moved upward (rotated clockwise) in FIG. 4, the CPU 30 of the lens device 12 performs processing so as to make the focus moved in the infinite direction. When the rotation operation of the focus knob 52 is performed in the reverse direction, the CPU 30 of the lens device 12 performs processing so as to make the focus moved in the close-range direction.

On the other hand, in the case where the operating direction selector switch 80 is set to the reverse mode, when the focus knob 52 is rotationally operated so that the front side of the focus knob 52 is moved upward (rotated clockwise), the CPU 30 of the lens device 12, contrary to the normal mode, performs processing so as to make the focus moved in the close-range direction. When the focus knob 52 is rotationally operated in the reverse direction, the CPU 30 of the lens device 12 performs processing so as to make the focus moved in the infinite direction. For example, when in the normal mode, the control of the focus is assumed to be performed such that as the value of the focus command signal outputted from the focus demand 14 is increased from a minimum value, the focus is moved from a close-range position to the infinity side, and the focus is set to an infinite end position when the value of the focus command signal is a maximum value. In the reverse mode, this relationship is reversed. Thus, as the value of the focus command signal outputted from the focus demand 14 is increased from a minimum value, the focus is moved from an infinite end position to the close-range side, and the focus is set to a closest end position when the value of the focus command signal is a maximum value.

This enables the cameraman to switch the relationship between the rotation direction of the focus knob 52 and the moving direction of the focus with respect to the rotation direction of the focus knob 52, for easy use. Further, in the case where contrary to the case shown in FIG. 4, the focus knob 52 is arranged to be on the left side of the focus demand 14 so that the focus demand 14 is operated with the left hand, when the focus knob 52 is rotationally operated so as to enable the front side of the focus knob 52 to be moved upward (counterclockwise), as viewed from the cameraman similarly to the case of right hand operation, it is possible to move the focus to the infinite direction by setting the reverse mode.

Subsequently, the mode of the direction display selector switch 82 is explained. When the direction display selector switch 82 is set to the normal mode, the CPU 30 of the lens device 12 transmits the display control signal which enables the lower light-emitting section 74A to be turned on to the operating direction display 20 at the time when the focus state is a front focus state, while the CPU 30 of the lens device 12 transmits the display control signal which enables the upper light-emitting section 74B to be turned on to the operating direction display 20 at the time when the focus state is a rear focus state. Note that the CPU 30 of the lens device 12 transmits the display control signal which enables the central light-emitting section 72 to be turned on to the operating direction display 20 irrespective of the mode, when the focus state is a focused state.

On the other hand, when the direction display selector switch 82 is set to the reverse mode, the CPU 30 of the lens device 12 transmits the display control signal which enables the upper light-emitting section 74B to be turned on to the operating direction display 20, contrary to the case of the normal mode, at the time when the focus state is a front focus state, while the CPU 30 of the lens device 12 transmits the display control signal which enables the lower light-emitting section 74A to be turned on to the operating direction display 20, at the time when the focus state is a rear focus state. This enables the cameraman to switch the relationship between the direction displayed by the operating direction display 20 and the rotation direction of the focus knob 52 for setting the focused state with respect to the direction displayed by the operating direction display 20, for easy use. For example, when the operating direction selector switch 80 is set to the normal mode and the direction display selector switch 82 is set to the reverse mode, the upper light-emitting section 74B is turned on at the time when the focus state is a front focus state. When the focus state is a front focus state, the focus knob 52 needs to be rotated upward (clockwise) in order to set the focused state. However, since the upper light-emitting section 74B above the central light-emitting section 72 is turned on, it is possible for the cameraman to judge that the focused state can be approached by rotating the focus knob 52 upward. In this way, since the display of the operating direction can be reversed in the operating direction display 20, even in the case where the cameraman is allowed to interpret the operating direction displayed by the operating direction display 20 as indicating any direction, (for example, when the upper light-emitting section 74B is turned on, even in either of the cases where the indicated operating direction is interpreted as indicating the upward operation of the focus knob 52, or where the indicated operating direction is interpreted as indicating the downward operation of the focus knob 52), the operating direction can be suitably displayed so as to be adapted to the direction interpreted by the cameraman.

Note that in the case where it is assumed that when the operating direction selector switch 80 is set to the normal mode, the direction display selector switch 82 set to the normal mode is in general easily used, when the operating direction selector switch 80 is set to the reverse mode, the direction display selector switch 82 may be automatically set to the reverse mode, even if it is not set to the reverse mode. At this time, when the direction display selector switch 82 is switched to the reverse mode, the direction display selector switch 82 may also be arranged to be switched to the normal mode.

In the above described embodiment, the function of controllably reversing the operating direction display displayed by the operating direction display 20 is provided, but the operating direction display may also be arranged to be mechanically reversed. That is, the upper and lower sides of the operating direction display 20 installed in the hood 60 as shown in FIG. 5 may also be arranged to be reversed.

Figure 7:
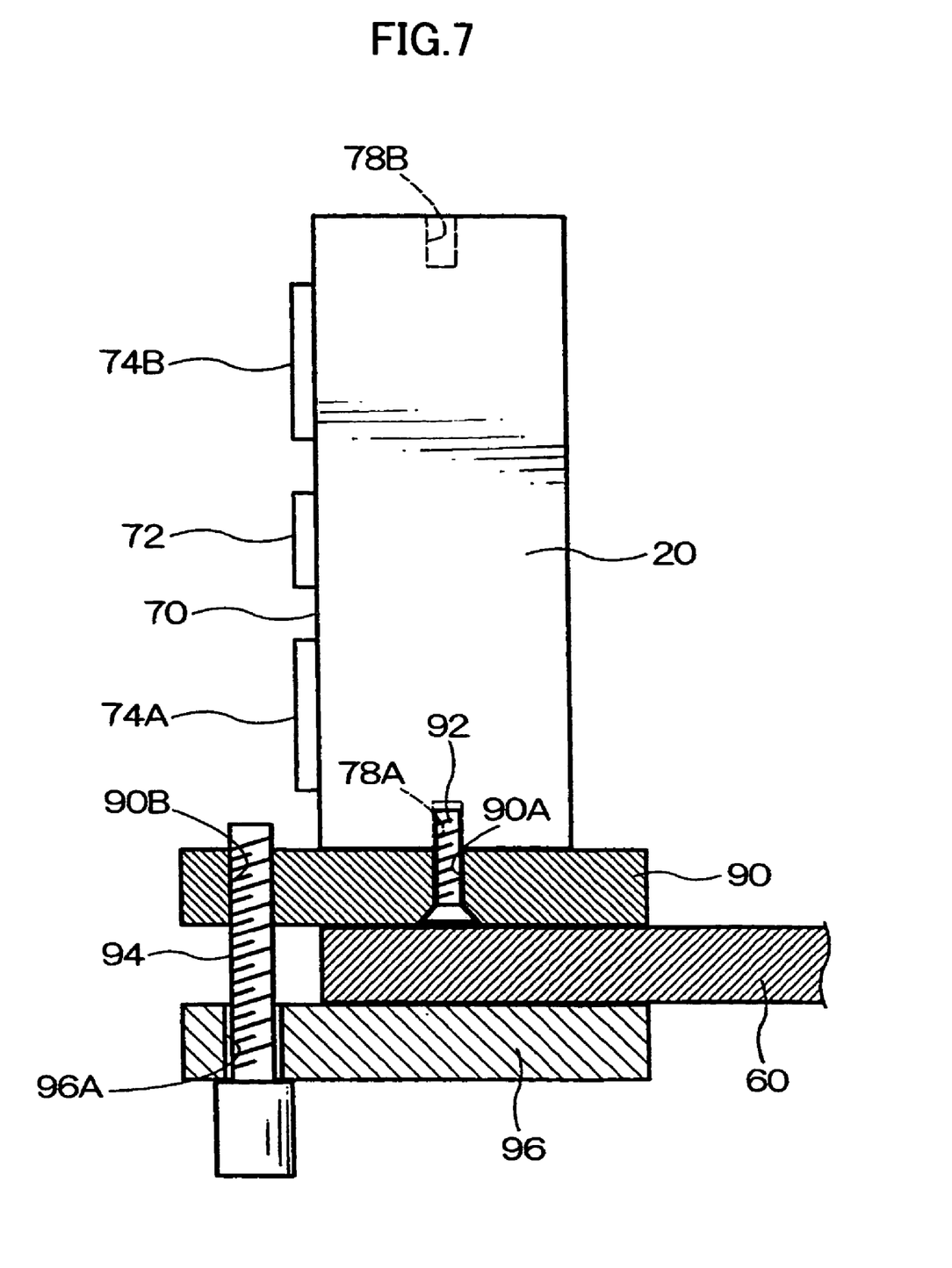
FIG. 7 is a side sectional view showing a mode which enables the operating direction display to be installed upside down.

For example, FIG. 7 is a side sectional view showing a fixing device 90 for installing the operating direction display 20 in the hood 60. As shown in the figure, a screw hole 78A is formed in the operating direction display 20. On the other hand, a hole 90A for inserting a screw 92 is formed in a plate-shaped member 90. The screw 92 inserted in the screw hole 78A of the operating direction display 20 from the lower surface side of the plate-shaped member 90 engages the screw hole 78A, thereby enabling the operating direction display 20 to be fixed in the state of being placed on the upper surface side of the plate-shaped member 90.

Further, a screw hole 90B is formed in the tip portion of the plate-shaped member 90, and a screw 94 inserted in a hole of a plate-shaped member 96 is made to engage the screw hole 90B. Then, the screw 94 is tightened so as to make the hood 60 of the view finder 18 shown in FIG. 5 sandwiched between the plate-shaped member 90 and the plate-shaped member 96, and thereby the plate-shaped member 90 and the plate-shaped member 96 are fixed to the hood 60. Consequently, the operating direction display 20 fixed to the upper surface of the plate-shaped member 90 is installed in the hood 60.

In the operating direction display 20 installed in this way, the screw hole 78B is also formed on the upper surface side of the operating direction display 20. Thereby, the upper and lower sides of the operating direction display 20 are reversed, and the screw 92 is made to engage the screw hole 78B on the upper surface of the plate-shaped member 90, as a result of which the operating direction display 20 can be installed in the hood 60 so as to be vertically inverted.

The display mode of operating direction in the display section 70 of the operating direction display 20 according to the above described embodiment is only an example, and the operating direction may also be displayed by other modes. For example, the two operating directions of the close-range direction and the infinite direction may also be arranged to be displayed with marks and characters such as "+" and "−", or "F" and "N", and with graphical symbols such as arrows. The central light-emitting section 72 for displaying that the focus is set to the focused state need not necessarily be provided in the above described embodiment. Further, in the above described embodiment, the operating direction of the focus operation member is displayed by the upper and lower directions as the spatial direction, but the operating direction may also be displayed by the right and left directions. Further, in the above described embodiment, the operating direction of the focus knob 52 for setting the focused state is arranged to be displayed by installing the operating direction display 20 in the hood 60 of the view finder 18. However, the operating direction display 20 may also be installed in a portion other than the hood 60, or may also be arranged to be incorporated in a device such as the focus-demand 14. Further, the operating direction of the focus knob 52 may also be arranged to be displayed on the screen of the view finder 18.

What is claimed is:

1. A lens system comprising:
 a focus operation member for manual operation of a focus of a taking lens;
 a focusing direction detecting device which detects a moving direction of the focus for setting a focused state with respect to a present position of the focus, as a focusing direction;
 an operating direction display device which displays an operating direction of the focus operation member for moving the focus to the focusing direction on the basis of the focusing direction detected by the focusing direction detecting device;
 a reversing device which reverses the operating direction displayed by the operating direction display device; and
 a selecting device which switches a relationship between a direction displayed by the operating direction display device and a direction of movement of the focus operation member for setting a focused state of the taking lens.

2. The lens system according to claim 1, wherein the selecting device selects whether or not the operating direction displayed by the operating direction display device is to be reversed by the reversing device.

3. The lens system according to claim 2, wherein the operating direction display device displays an operating direction by turning on one of display sections arranged on upper and lower sides with respect to a predetermined central position, or by turning on one of display sections arranged on left and right sides with respect to a predetermined central position.

4. The lens system according to claim 3, wherein the focusing direction detecting device detects a focusing direction by detecting a direction in which contrast of an image formed by the taking lens is enhanced.

5. The lens system according to claim 2, wherein the focusing direction detecting device detects a focusing direction by detecting a direction in which contrast of an image formed by the taking lens is enhanced.

6. The lens system according to claim 1, wherein the operating direction display device displays an operating direction by turning on one of display sections arranged on upper and lower sides with respect to a predetermined central position, or by turning on one of display sections arranged on left and right sides with respect to a predetermined central position.

7. The lens system according to claim 6, wherein the focusing direction detecting device detects a focusing direction by detecting a direction in which contrast of an image formed by the taking lens is enhanced.

8. The lens system according to claim 1, wherein the focusing direction detecting device detects a focusing direction by detecting a direction in which contrast of an image formed by the taking lens is enhanced.

9. The lens system according to claim 1, further comprising:
   a second selecting device for switching a relationship between a direction of movement of the focus operation member and a moving direction of the focus of the taking lens in an infinite direction or in a close range direction.

10. The lens system according to claim 9, wherein said second selecting device switches a relationship between a direction of rotation of the focus operation member and a moving direction of the focus of the taking lens in an infinite direction or in a close range direction.

11. The lens system according to claim 1, wherein the direction of movement of the focus operation member is a direction of rotation.

12. The lens system according to claim 1, wherein said relationship is a relationship between an up or down direction displayed by the operating direction display device and a clockwise or counter-clockwise direction of rotation of a knob included in the focus operation member.

* * * * *